Patented Mar. 30, 1954

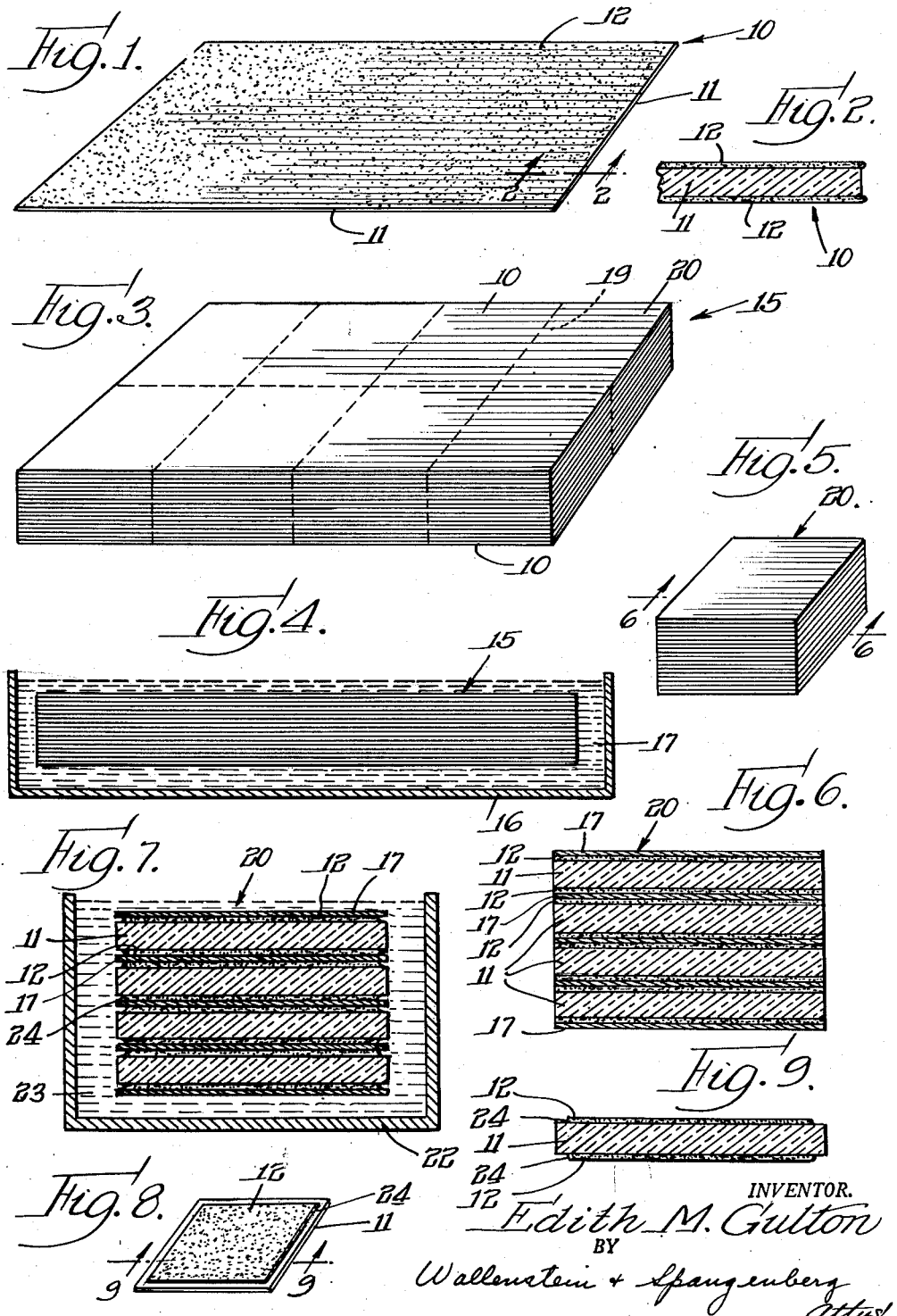

2,673,792

UNITED STATES PATENT OFFICE 2,673,792

METHOD OF MAKING CONDENSER

Edith M. Gulton, Metuchen, N. J., assignor to Gulton Mfg. Corp., Metuchen, N. J., a corporation of New Jersey Application October 23, 1950, Serial No. 191,588

5 Claims. (Cl. 41—43)

This invention relates to silvered ceramic capacitors and the manner of producing the same. More particularly, it relates to the manner of deburring the same for eliminating the corona at the edges of such capacitors.

Silvered ceramic capacitors are quite fragile and have very thin silver coatings on the faces of the ceramic dielectric, and the edges of the silver coatings are usually irregular and often overhang the edges of the ceramic dielectric sheet. These irregular and overhanging edges often result in the formation of a corona about the edges of the ceramic dielectric upon subjecting the capacitor to charging voltages. It has been the practice in smoothing or deburring the edges of the capacitors to tumble them in an abrasive material which results in large breakage losses because of their fragile character and which also results in considerable abrasion of the silvered surfaces. In this latter respect it has been necessary initially to apply thicker silver coatings to compensate for this abrasive loss. As a result, the deburring and production costs have been excessive and even so, effective elimination of the corona effect has not been brought about.

The principal object of this invention is to provide an improved process of producing silvered ceramic capacitors and deburring the same wherein the aforementioned difficulties are obviated, wherein deburring and production costs are materially reduced, wherein breakage is reduced, wherein abrasion of the silver coatings is eliminated, wherein thinner silver coatings may be initially applied, wherein smoother edges on the silver coatings and the ceramic dielectric are obtained, and wherein the corona effect is eliminated.

Briefly, the process of this invention comprises covering the silvered faces of the silvered ceramic capacitor with an acid resistant substance, subjecting the edges of the silvered ceramic capacitor to an acid for etching the edges of the silvered faces, and removing the acid resistant substance. This process effectively deburs the capacitor without breakage and abrasion of the silvered surfaces and smooths the edges of the silver coatings and the ceramic dielectric. In the deburred capacitor the edges of the silver coatings also terminate short of the edges of the ceramic dielectric whereby the corona effect at the edges of the capacitor is eliminated. The process of this invention also contemplates deburring stacks or blocks of silvered ceramic capacitors at a time thereby affording still greater economies.

Other objects and advantages of this invention will become apparent to those skilled in the art upon reference to the following specification, claims, and drawing, in which:

Figure 1 is a perspective view of a ceramic dielectric sheet with silver coatings on its face;

Figure 2 is an enlarged sectional view taken substantially along the line 2—2 of Figure 1;

Figure 3 is a perspective view showing a stack of silvered ceramic sheets illustrated in Figure 1;

Figure 4 illustrates the stack of sheets being covered and impregnated with an acid resistant substance to form a block of such sheets;

Figure 5 is a perspective view of a section cut from the block;

Figure 6 is an enlarged sectional view taken along the line 6—6 of Figure 5.

Figure 7 is a view illustrating the manner of etching the edges of the silver coatings contained in the section;

Figure 8 is a perspective view of a completed deburred silvered ceramic capacitor;

Figure 9 is an enlarged sectional view taken along the line 9—9 of Figure 8.

Referring first to Figures 1 and 2, there is generally designated at 10 a silver coated ceramic dielectric sheet consisting of a sheet 11 of dielectric ceramic, such as a barium titanate or the like ceramic. This sheet has its opposite face silvered by means of silver coatings 12, these silver coatings being applied in conventional fashion as by painting the faces with silver and then heating the same. As will be noted in Figure 2, the edges of the silver coatings 12 are uneven and rough and overlie the edges of the sheet 11. If such a silver ceramic sheet is electrically charged, a corona effect will appear.

These silvered ceramic dielectric sheets 10 are then stacked into a block generally designated at 15. The sheets 10 are stacked into the block 15 in a suitable receptacle 16 containing an acid resistant substance 17, such as paraffin, the paraffin being heated into liquid form, so that the silvered surfaces of the sheets 10 and the entire block are covered with paraffin. When the stack 15 is removed from the paraffin, the paraffin solidifies to form a solid block of silvered ceramic sheets.

This block is then cut along lines 19 as illustrated in broken lines in Figure 3 to form sections generally designated at 20, which sections then contain silvered ceramic sheets of the desired size for forming capacitors. Here again, the silver coatings of these cut sheets are irregular or uneven and operate to produce corona effects if the sheets are electrically charged.

The edges of the section 20 are then mechanically cleaned so as to remove all paraffin therefrom. The section 20, as illustrated in Figure 7, is then placed in a suitable vat 22 containing an acid 23, such as nitric acid, which etches the edges of the silver coatings in the section 20. The etching effect is illustrated at 24. Only the edges of the silver coatings 12 are etched, since the surfaces of those coatings are covered with the acid resistant substance. The edges of the silver coatings, by reason of the etching action, become smooth and they also terminate short of the edges of the ceramic dielectric 11. It is found that suitable etching action is obtained when the sections 20 are subjected to nitric acid at 20 per cent to 70 per cent concentration for 8 hours to ½ hour at ambient temperature. Of course, these ranges of concentration, time, and temperature may be varied in order to obtain desired etching actions.

After the stack or section 20 is so etched, the paraffin may be removed by dissolving the same in a suitable solvent, such as benzine. The stack or section 20 is thus separated into completely deburred silvered ceramic capacitors as illustrated in Figures 8 and 9 wherein the silvered coatings 12 retain their original thickness, wherein the edges 24 of the silver coatings are smooth and even, and wherein the edges of the silver coatings may terminate short of the edges of the dielectric ceramic as indicated at 24. As a result, the corona effect upon charging of the capacitor is substantially entirely eliminated. It has been found by comparison that the application of a charging voltage of 500 volts will break down and produce a corona on a silvered ceramic capacitor which has not been deburred and that when the silvered ceramic capacitor has been deburred in the manner of this invention, it will stand a voltage of 1700 volts.

While for purposes of illustration one form of this invention has been disclosed, other forms thereof may become apparent to those skilled in the art, and therefore, this invention is to be limited only by the scope of the claims.

I claim as my invention:

1. A process for producing a silvered ceramic capacitor comprising the steps of, silvering the faces of a ceramic sheet by applying a silver coating thereto, completely covering the silvered faces with an acid resistant substance but leaving the edges thereof exposed, subjecting the exposed edges of the silvered ceramic sheet to an acid for etching the edges of the silver coatings, and removing the acid resistant substance.

2. A process for producing silvered ceramic capacitors comprising the steps of, silvering the faces of a plurality of ceramic sheets by applying a silver coating thereto, stacking the silvered ceramic sheets in a block with an acid resistant substance between the sheets and around the block, cutting the block into sections of desired size and removing the acid resistant substance from the edges of the sections to expose the edges of the silvered ceramic sheets, subjecting the exposed edges of the silvered ceramic sheets of the sections to an acid for etching the edges of the silver coatings, and removing the acid resistant substance and separating the sections into separate silvered ceramic capacitors.

3. A process for deburring a silvered ceramic capacitor comprising the steps of, completely covering the silvered faces of the capacitor with an acid resistant substance but leaving the edges thereof exposed, subjecting the exposed edges of the silvered ceramic capacitor to an acid for etching the edges of the silvered faces, and removing the acid resistant substance.

4. A process for deburring silvered ceramic capacitors comprising the steps of, stacking the silvered ceramic capacitors in a block with an acid resistant substance on the silvered faces and between the capacitors but with the edges of the capacitors exposed, subjecting the exposed edges of the capacitors in the block to an acid for etching the edges of the silvered faces, and removing the acid resistant substance and separating the block into separate deburred silvered ceramic capacitors.

5. A process for deburring a silvered ceramic capacitor comprising the steps of, completely covering the silvered faces of the capacitor with paraffin but leaving the edges thereof exposed, subjecting the exposed edges of the silvered ceramic capacitor to nitric acid of substantially 20 per cent to 70 per cent concentration for substantially 8 hours to ½ hour at substantially ambient temperature for etching the edges of the silvered faces, and removing the paraffin.

EDITH M. GULTON.

References Cited in the file of this patent

UNITED STATES PATENTS

| Number | Name | Date |
|---|---|---|
| 1,909,079 | Steerup | May 16, 1933 |
| 2,291,592 | Dowling | July 28, 1942 |
| 2,368,645 | De Sylva | Feb. 6, 1945 |
| 2,437,212 | Schottland | Mar. 2, 1948 |
| 2,441,960 | Eisler | May 25, 1948 |
| 2,607,825 | Eisler | Aug. 19, 1952 |